United States Patent [19]

Hallenius et al.

[11] 4,363,563

[45] Dec. 14, 1982

[54] SYSTEM FOR THE STORAGE OF PETROLEUM PRODUCTS AND OTHER FLUIDS IN A ROCK

[75] Inventors: Tore J. Hallenius, Sundsvall; Karl I. Sagefors, Öregrund, both of Sweden

[73] Assignee: WP-System Aktiebolag, Sundsvall, Sweden

[21] Appl. No.: 13,423

[22] Filed: Feb. 21, 1979

[30] Foreign Application Priority Data

Feb. 21, 1978 [SE] Sweden .................................. 7802027
Feb. 13, 1979 [SE] Sweden .................................. 7901278

[51] Int. Cl.³ .............................................. B65G 5/00
[52] U.S. Cl. ........................................ 405/55; 405/53
[58] Field of Search ...................................... 405/53–58

[56] References Cited

U.S. PATENT DOCUMENTS

| | | | |
|---|---|---|---|
| 26,481 | 12/1859 | Doyere | 405/53 X |
| 2,788,637 | 4/1957 | Benz | 405/53 X |
| 2,871,668 | 2/1959 | Reed | 405/53 X |
| 2,930,197 | 3/1960 | Carpenter | 405/53 |
| 3,152,640 | 10/1964 | Marx | 405/53 X |
| 3,986,339 | 10/1976 | Janelid | 405/53 X |
| 4,045,963 | 9/1977 | Hansson et al. | 405/53 |

FOREIGN PATENT DOCUMENTS 1203166  1/1960  France ................................. 405/53

Primary Examiner—Dennis L. Taylor
Attorney, Agent, or Firm—McAulay, Fields, Fisher, Goldstein & Nissen

[57] ABSTRACT

A system for the underground storage of fluids, e.g. petroleum products in rock. The system comprises a plurality of cavities excavated in the rock. Each of said cavities has a cylindrical shape with a circular or oval cross-section. Each cavity forms a storage space the walls of which are formed by the rock and directly absorb the pressure of the fluid stored in the cavity. The cavities are arranged with their center axes standing vertically, and the vertical height of each cavity is greater than or equal to the diameter of its cross-section. The distance from each cavity to adjacent cavities is equal to or greater than the diameter of the cross-section of the cavity, and the centers of the cross-sections of the cavities as seen in a horizontal cross-section of the whole system are positioned in a two-dimensional pattern.

11 Claims, 8 Drawing Figures

SYSTEM FOR THE STORAGE OF PETROLEUM PRODUCTS AND OTHER FLUIDS IN A ROCK

The invention relates to a system for the storage of petroleum products and other fluids in rock, which system comprises a plurality of cavities excavated in the rock.

It is previously known to store petroleum products and other fluids lighter than water in groundwater-bearing rock, the stored liquid directly resting against the permeable wall surface of the cavity. The liquid stored in the cavity is prevented from penetrating the permeable wall surface of the cavity because the pressure of the groundwater counteracts the pressure of the liquid stored in the cavity. If the stored liquid is lighter than water and insoluble in water it is usual to provide a water-bed in the bottom part of the cavity.

A previously known system for this purpose consists of oblong cavities having their largest extension in a horizontal direction.

Another known system for this purpose comprises a plurality of separate containers which are located within a larger cavity in the rock.

It is an object of the invention to provide a system for the storage of petroleum products and other fluids in rock, which system has a very large storage capacity although it has a relatively small extension in horizontal directions. Thereby the stored product is located within a concentrated area, and it is easier to protect the area with a water curtain consisting of drilled holes filled with water to prevent the groundwater from sinking, whereby the stored product is also prevented from spreading to the environment of the system.

The system of the invention comprises a plurality of cavities excavated in the rock, and each of said cavities has a substantially cylindrical shape with a circular or oval cross-section, each cavity forming a storage space the walls of which are formed by the rock and directly absorb the pressure of the fluid stored in the cavity, and the cavities are arranged with the center axis standing vertically, the vertical height of the cavity being greater than or equal to the diameter of its cross-section, and the distance from each cavity to adjacent cavities is equal to or greater than the diameter of the cross-section of the the cavity, and the centers of the cross-sections of the cavities as seen in a horizontal cross-section of the whole system are positioned in a two-dimensional pattern.

Preferably the cavities are so arranged, that their vertical axes as seen in horizontal cross-sectional planes are so located, that the connecting lines in these planes between the axes of each group of three adjacent cavities form a triangle all the angles of which are between 30° and 120°.

The system of the invention affords several advantages as compared with conventional systems for the same purpose.

The system of the invention is compact and requires a minimum of ground area. Therefore it is possible to build very large storage systems even within limited areas. The area required for the storage becomes a minimum. Then it will be easier to provide the means required to avoid a sinking of the groundwater in environment. The geometrical configuration of the system makes it easy to provide water curtains between the cavities and also around the whole system. These water curtains consist of rows of drilled vertical holes which are filled with water. By means of these water curtains the groundwater level within and outside the system can be maintained in a simple manner. The concentrated area occupied by the system makes it easier to locate the system within a homogenous rock volume, whereby damages to the environment are more easily avoided.

Since each cavity has a height which is larger than its diameter, the rock in which the system is situated will be better utilized in a vertical direction which makes it possible to make the system more compact and to obtain a better economy as regards the utilization of the ground area, and if the stored product is heated a better heat-economy is also obtained.

Because of the height of the cavities a sufficient pressure height for the stored product is obtained, so that the product can be more easily emptied by means of pumps located beneath the cavities. The bottom parts of the cavities can be shaped like funnels, whereby the rate of discharge becomes high until the cavity is wholly emptied. The extent of required piping insulations becomes less due to the compact design of the system.

If the stored product is to be heated, the heat can be applied in a desired part of the cavities and at a desired level.

If the stored products are depositing sludge, the sludge can easily be collected and pumped away in a system of the invention, and it is not necessary to provide large volumes for the final deposition of the sludge in the bottom of the system.

Leaking water in the rock can be conducted through relatively short flow paths to a pit for pumps located beneath the system, whereby the discharge of the leakage water is facilitated.

The shape of the cavities also facilitates locating sensors for control equipment, for instance temperature sensors and level sensors and the like. The shape of the system facilitates the use of very smooth blasting methods.

The shape of the system is favourably adapted to the existing rock pressure, and therefore in a given rock volume it is possible to utilize larger cross-sectional areas and/or to decrease the costs for reinforcement.

The choice of site for the storage system is facilitated because the total rock volume required for the system becomes less than in conventional systems.

The geometrical shape and the location of the cavities in relation to each other is advantageous because the horizontal rock tensions which are usually very large, are absorbed and distributed in a favourable manner in the rock between the cavities.

Since the cavities have a circular or oval cross-section, the walls of the cavity are nearly everywhere subjected to pressures of a moderate strength, whereby the need of bracing or other reinforcement is decreased.

The building of the system can be carried out according to a working plan which permits a uniform utilization of available resources, so that the production can be carried out continuously without delays and interruptions, so that the time for the production becomes short.

The invention will now be described with reference to the accompanying drawings.

Figure 1:
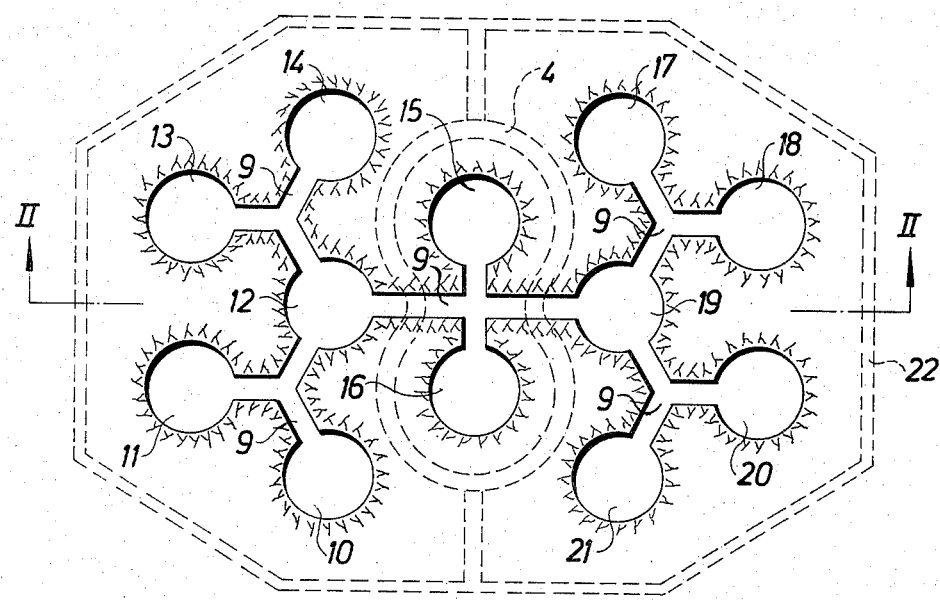
FIG. 1 shows a horizontal section of an embodiment of the system according to the invention. This section is taken along line I—I in FIG. 2.
Figure 2:
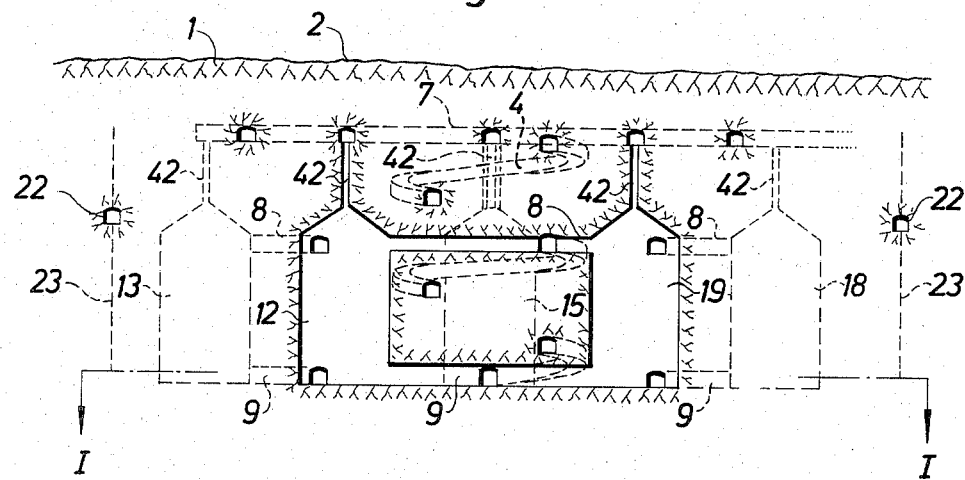
FIG. 2 shows a vertical section of the system shown in FIG. 1. This section is taken along line II—II in FIG. 1.

The system shown in FIGS. 1 and 2 comprises twelve cavities designated 10 to 21. Each cavity has a substantially cylindrical shape. All the cavities are located in the bedrock (1 in FIG. 2) at a certain depth below the ground surface (2 in FIG. 2).

The cavities are connected with each other both at the upper portions and the bottom portions. The tunnels interconnecting the top portions of the cavities are designated 8 in FIG. 2, and the tunnels interconnecting the bottom portions are designated 9 in FIGS. 1 and 2. A horizontal tunnel 7 extends above all the cavities. From the top of the roof in each cavity a vertical shaft 42 extends up to the tunnel 7. The shafts 42 can be used for the accommodation of pipings through which each cavity can be filled and emptied separately. The tunnels 7, 8, and 9 are interconnected by a tunnel 4 which extends from above and downwards in a curved path as indicated by the dotted line 4 in FIG. 2. The said tunnels serve as working tunnels in the excavation of the system. When the system is built these tunnels are driven at first and the excavation of the cavities is commenced both from above and from below as will be later described with reference to FIGS. 6-8. The rock spoil is transported out through the tunnels. When the system is complete, these tunnels can be used for the accommodation of pumps and pipings. Before the excavation of the system a tunnel is first driven from the ground surface down to a place from where the tunnel 4 extends from above and down to the bottom of the system as previously described. From tunnel 4 the other connecting tunnels are then driven.

A horizontal tunnel 22 extends around the whole system at the same level as the top portions of the cavities. From tunnel 22 vertical holes 23 are drilled, and these holes are evenly spaced around the whole system. The holes 23 are filled with water and form a water curtain which surrounds the whole system.

The embodiment shown in FIGS. 3 and 4 will now be described.

Figure 3:
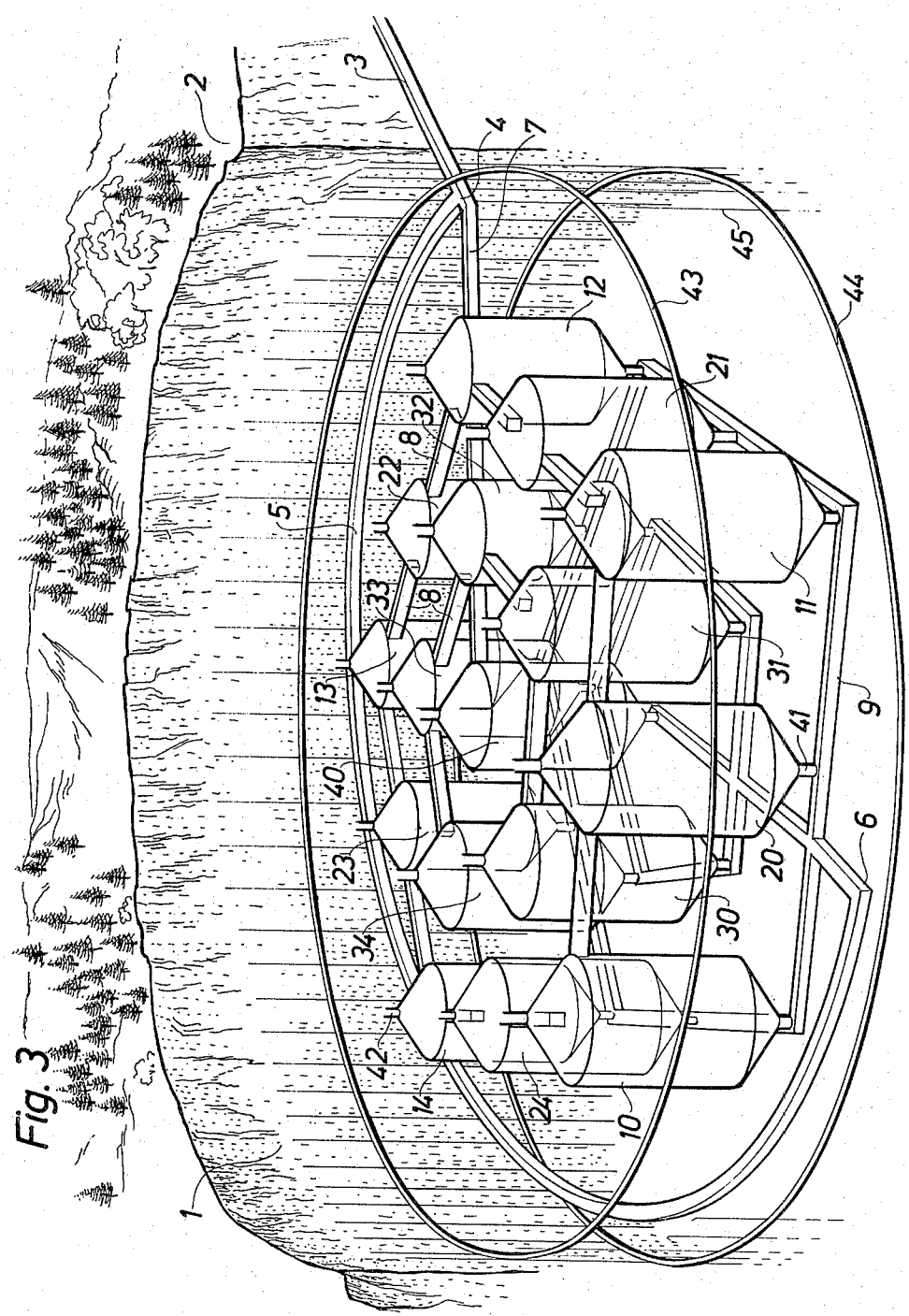
FIG. 3 is a perspective view of an embodiment of the system according to the invention.

In FIG. 3 numeral 1 designates the bedrock in which the system is located at a certain depth below the ground surface 2. The embodiment shown in FIG. 3 comprises 16 cavities. How these cavities are arranged in relation to each other will be seen most clearly in FIG. 4 which shows schematically a horizontal section through the whole system. Five cavities 10-14 are arranged in an outer circle so that their centers form the corners of a regular pentagon. This pentagon is designated 15 in FIG. 4 and the circumscribed circle 16. Five other cavities 10-24 are so arranged that their center axes are located in a pentagon 25 with the circumscribed circle 26 the radius of which is somewhat less than the radius of circle 16. Another five cavities 30-34 are arranged with their center axes in the corners of an inner pentagon 35 with the circumscribed circle 36. The said circles and pentagons have a common center. An additional cavity 40 is arranged around this center. In the arrangement shown in FIG. 4 the cavities 20-24 are so arranged that their horizontal cross-section touches the circle 16 along which the cavities 10-14 are located. However, the radius of circle 26 along which the cavities 10-24 are located may even be greater or less than that shown in FIG. 4. Thus, the cavities 20-24 may be so located that their center axes are located in the middle points of the connecting lines between the cavities 10 and 14. Alternatively the cavities 10-24 can be arranged along the same circle (16) as the cavities 10-14.

As shown in FIG. 3 a tunnel 3 extends from the ground surface down to the system. The tunnel 3 branches at a place 4 which is located at the same level as the top portions of the cavities. From the place 4 as first tunnel branch 5 extends in an inclined bow to a place 6 which is located at a level beneath all the cavities. A second tunnel branch 7 extends horizontally from the place 4 to the top portion of cavity 12. The top portions of the cavities are interconnected by means of tunnels 8. From the lower end 6 of the tunnel 5 a system of tunnels 9 extends below the whole system, and this tunnel system 9 extends below every cavity. The said tunnels serve as working tunnels in the excavation of the system. From the tunnel system 9 vertical shafts 41 extend up to the bottom of each cavity. When the system is built these tunnels are first driven, and the excavation of the cavities is begun both from above and from below as will be later described with reference to FIGS. 6-8. The rock spoil is transported out through the tunnels. When the system is complete, these tunnels can be used for the accommodation of pumps and pipings.

Two tunnels 43 and 44 extend around the whole system. The tunnel 43 extends around the top portion of the system and the tunnel 44 around the bottom portion of the system. These tunnels are connected to each other by a plurality of vertical shafts or drill holes 45. The drill holes 45 do not extend only between the tunnels 43 and 44 but also above the tunnel 43 and below the tunnel 44. The tunnels 43 and 44 and the drill holes 45 are filled with water and form a water curtain around the whole system. Depending on the porosity of the rock and the ground-water conditions it may be desirable to extend the water curtain to the area between the system and the ground surface and/or to the area below the system.

The cavities have conical roofs and bottoms. From the top portion of the roof of each cavity a vertical shaft 42 extends up to the ground surface. The shafts 42 can be used for the accommodation of pipings through which each cavity can be filled and emptied separately.

Figure 5:
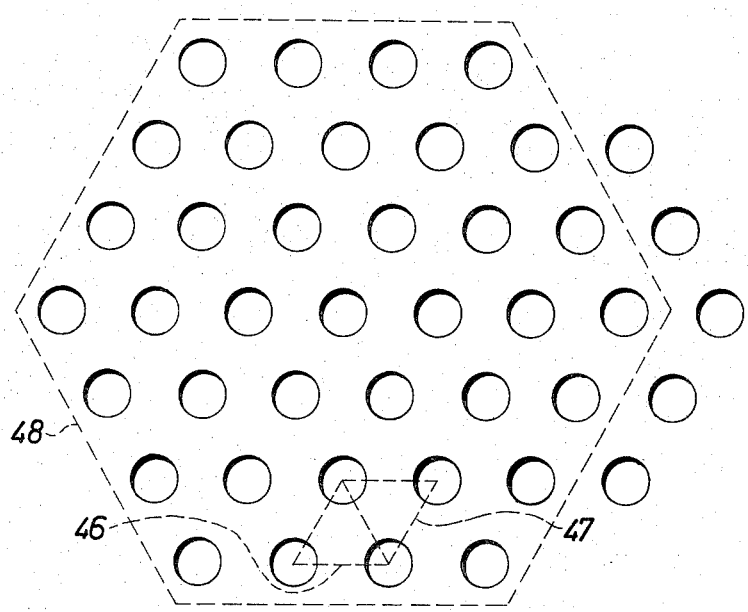
FIG. 5 shows schematically the geometrical configuration of the cavities in an other embodiment.

FIG. 5 shows schematically in horizontal section the geometrical configuration of the cavities in another embodiment of the invention. In FIG. 5 the cavities are indicated by circles, and the imagined connecting lines between the centers of adjacent circles form equilateral triangles, for instance the triangles 46 and 47. Thus these triangles form a regular network having triangular meshes.

The embodiment shown in FIG. 5 can be so designed that its outer contour has the shape of a regular hexagon as shown by the dotted line 48. However, the whole system can also be so designed that horizontally it has a larger extension in one direction than in a direction at right angles thereto. In FIG. 5 this is indicated by some cavities being drawn to the right outside the dotted hexagon 48. Such an arrangement may be advantageous in the case that the stresses in the rock are larger in one direction than in the other direction. The system should then have its largest extension in the direction in which the rock stresses are largest.

In other respects the embodiment shown in FIG. 5 can be designed in similar manner as the embodiment shown in FIG. 3.

Figure 4:
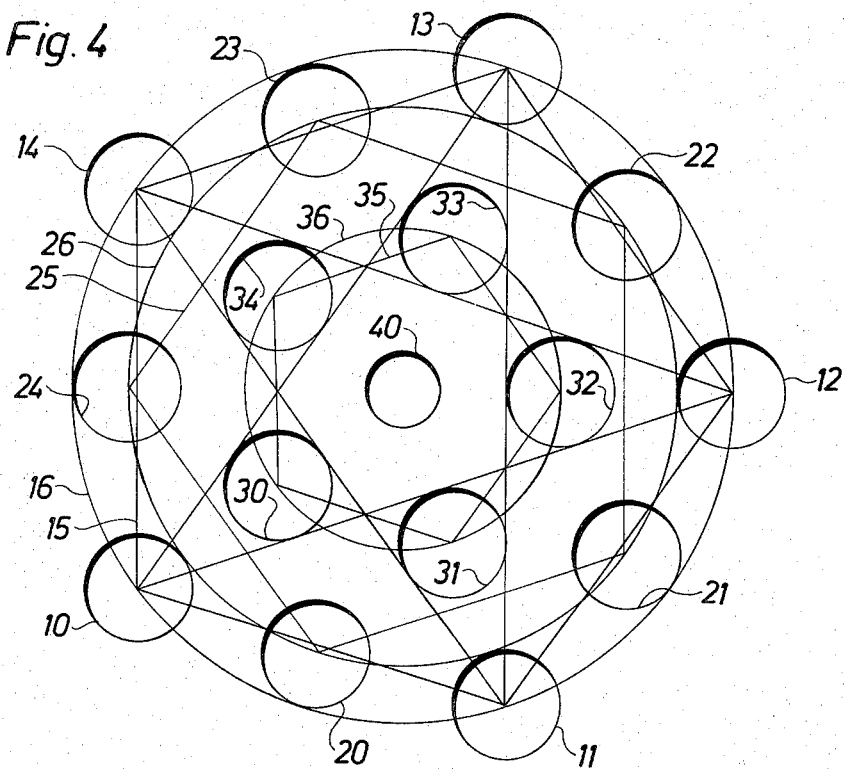
FIG. 4 shows schematically the geometrical configuration in which the cavities in the system shown in FIG. 3 are arranged.

In FIGS. 4 and 5 the horizontal section of the cavities has been shown circular. However, within the scope of the invention this horizontal section can even have an oval or elliptical shape. This is especially suitable in the case that the horizontal stress in the rock is much larger in one direction than in an other direction at right angles thereto. The oval or elliptical horizontal section of the cavities should then have its largest extension in the direction in which the rock stress is largest.

Figure 6:
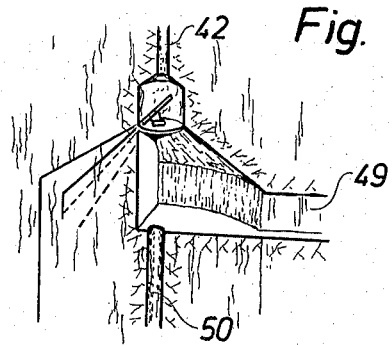
FIGS. 6-8 show different stages in the excavation of a cavity.
Figure 7:
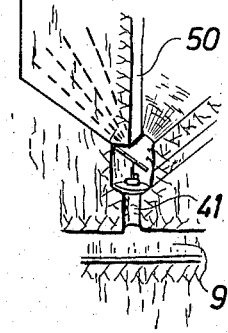
Figure 8:
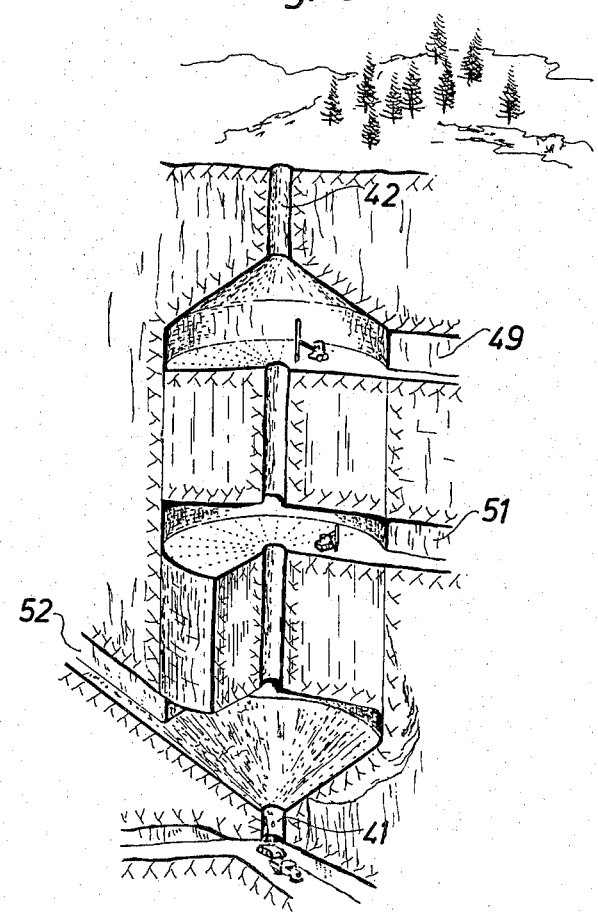

The excavation of the cavities may be carried out by methods well known in the art. FIGS. 6–8 illustrate a suitable method in the excavation of the cavities. At first a tunnel system as described with reference to FIG. 3 is driven in the rock. A tunnel 49 is driven towards the upper part of the future cavity as shown in FIG. 6. The tunnel 49 may be identical to the tunnel 7 shown in FIG. 3. Between the ground surface and the future roof of the cavity the vertical shaft 42 is driven. This shaft 42 is widened at the lower part and in this widened part a boring machine is located, by means of which drill holes are bored along the future conical roof of the cavity.

From the tunnel system 9 below the system vertical shafts 41 are driven upwards towards the future bottom of the cavity. From an expanded portion of this shaft 41 drill holes for the excavation of the conical bottom of the cavity are driven as shown in FIG. 7.

Through the future cavity a central vertical shaft 50 is also driven. In the excavation of the upper portion of the cavity the excavated material (the rock spoil) is allowed to fall down through this shaft and through the shaft 41 to the tunnel 9 where the material falls down on a conveyor which transports the material to a suitable vehicle as shown at the bottom of FIG. 8. When the roof and the bottom of the cavity are finished the excavation of the cylindrical main portion of the cavity is begun. If the cavity is to have a very large height, it may be advantageous to drive an additional working tunnel 51 towards half the height of the cavity as shown in FIG. 8, from this tunnel the lower portion of the cavity is excavated at the same time as boring and blasting is going on in the upper portion of the cavity. All the cavities need not have the same height. If the cavity has its bottom situated at a higher level than the bottom of an adjacent cavity, a tunnel 52 can be driven from the bottom of the first mentioned cavity sloping down to the bottom of the adjacent cavity. Through this tunnel 52 the excavated material in the firstmentioned cavity can fall down to the bottom of the lastmentioned cavity and further down through the shaft 41.

In the shown embodiments the main portion of the cavity has a cylindrical shape with vertical walls, that is the cylindrical portion has everywhere the same horizontal cross-section.

If pieces of rock should come loose from the walls of the cavity the pieces when falling downwards may grate on the walls and cause the formation of sparks which may cause explosion if explosive gases are present in the cavity. In order to eliminate this risk the cavities can be so designed that the main portion is tapering upwards. Hereby pieces of rock that may come loose will fall freely towards the bottom of the cavity where they hit the water bed located therein or the surface of the stored product.

The system is preferably located at such a great depth that it is wholly located below the ground-water level.

However, this is not always possible or desirable. If the cavities in part extend above the ground-water level, that part of the system which is located above the ground-water level, may be surrounded by a relatively dense water curtain and/or a screen of material, for instance clay, which is impermeable to the fluid to be stored in the system. The system of the invention in the first place is intended for the storage of petroleum products such as crude oil and refined oil products. However, the system of the invention can also be used for the storage of other liquid products such as water.

We claim:

1. A system for the underground storage of fluids in rock, said fluids having a specific gravity lower than water comprising a plurality of cavities excavated in the rock, each of said cavities being cylindrical with an axis and a diameter, each cavity forming a storage space, the walls of which are formed by the rock and directly absorb the pressure of the fluid stored in the cavity, the axes of all said cavities being vertical, the vertical height of each cavity being at least equal to its diameter, the distance from each cavity to each adjacent cavity being at least equal to said diameter, and said axes of said cavities as seen in a horizontal cross-section of the system forming a two-dimensional pattern in the form of at least one regular polygon.

2. A system as claimed in claim 1 wherein water curtains are provided in the rock between the cavities and surrounding the outside of the system and above the system, each water curtain consisting of a plurality of vertical evenly spaced drilled holes located adjacent to each other, said drilled holes being adapted for filling with water whereby the ground water level in the vicinity of the system can be controlled.

3. A system as claimed in claim 2 wherein said two-dimensional pattern includes adjacent cavities forming triangles, the angles of each of said triangles being between 30° and 120°.

4. A system as claimed in claim 3 wherein said axes are located at corners of regular polygons all of which have the same number of sides.

5. A system as claimed in claim 4 wherein said regular polygons are pentagons situated within each other and having a common center.

6. A system as claimed in claim 5 wherein an additional cavity is located with its axis at said common center of said pentagons.

7. A system as claimed in claim 5 which comprises an inner ring of cavities having their axes at corners of an inner polygon, and two outer rings of cavities the axes of which are located at the corners of two outer pentagons the circumscribed circles of which have the same or slightly different radii, each corner of one of the outer pentagons being located midway between two corners of the other outer pentagon.

8. A system as claimed in claim 2 wherein most of said triangles are equilateral and form together a network having triangular meshes.

9. A system as claimed in claim 2 wherein said water curtains include at least two horizontal tunnels in the rock, one of said tunnels being located at the same level as the upper portions of the cavities, and the other tunnel being located at the same level as the bottom portions of the cavities, and said drilled holes interconnecting said two tunnels.

10. A system as claimed in claim 2 wherein the cavities extend above the ground-water level, and that part of the system which extends above the ground-water level is surrounded by a screen of a material, for instance clay, which is impermeable to the fluid to be stored in the system.

11. A system as claimed in claim 1 wherein said rock has greater stress therein in a first direction than in a second direction at right angles to said first direction, each of said cavities having an oval horizontal cross section, the longer dimension of said oval cross section being aligned substantially parallel to said first direction.

* * * * *